United States Patent [19]

Mylaeus

[11] 3,995,962
[45] Dec. 7, 1976

[54] BUILDING KIT FOR THE PRODUCTION OF THREE-DIMENSIONAL FRAMEWORKS

[76] Inventor: Armin Mylaeus, Haydnstrasse 10, 597 Plettenberg, Germany

[22] Filed: June 3, 1975

[21] Appl. No.: 583,489

[30] Foreign Application Priority Data

June 4, 1974  Germany .......................... 2426973

[52] U.S. Cl. ................................ 403/47; 403/171; 52/648; 285/219
[51] Int. Cl.² .......................................... F16B 7/00
[58] Field of Search .......... 403/171, 176, 170, 172, 403/169, 47, 296; 52/648; 285/219

[56] References Cited

UNITED STATES PATENTS 2,485,280  10/1949  Grace .................................. 403/47

FOREIGN PATENTS OR APPLICATIONS 73,569  8/1960  France ............................. 403/296
410,185  3/1945  Italy .................................. 403/171

Primary Examiner—Andrew V. Kundrat
Attorney, Agent, or Firm—Allison C. Collard

[57] ABSTRACT

A building kit for the production of three-dimensional frameworks comprising ball-shaped joints having threaded joint bores and integral formed tube-shaped rods, the end regions of which are formed with a substantially reduced diameter relative to the thickness of the rod by means of a bottleneck-shaped construction thereof having an internal thread, the pitch of which has the same sense as that of the joint bores and deviates from the pitch of the threads of the joint bores. Coupling means are provided at the rod end regions for threaded connection of the rods with the bores of the joints, the coupling means each comprising a bolt provided at both ends with bolt threads of a same sense and of a different pitch and a box spanner sleeve axially displaceable yet not rotatably disposed thereon.

2 Claims, 2 Drawing Figures

BUILDING KIT FOR THE PRODUCTION OF THREE-DIMENSIONAL FRAMEWORKS

The invention relates to a building kit for the production of three-dimensional frameworks with ball-shaped joints, tube-shaped rods and with coupling devices provided at the rod ends for threaded connection of the rods with the joints, the latter having threaded bores.

In a known building kit of this type, the coupling devices consist of a ball-shaped joint member, which possesses bores with internal threads, whereas rotatable and longitudinally displaceable threaded bolts serve as connecting parts which are supported in a bearing bore of a connecting part welded onto each rod end, and which are encompassed by a box spanner sleeve with a hexagon and slots on two mutually opposite sides and an entraining pin which is fixed in the bolt and is longitudinally slidable in the slots of the box spanner sleeve serves for the force transmission. Although components of this kind, due to their relative ease of assembling to be carried out according to the building kit principle, have indeed proved themselves quite well in practice, they are not free of disadvantages. In this case it is to be particularly emphasized firstly, that three movable parts are required for the threaded connection of each tubular rod, namely a special screw with round head, an entraining pin and a box spanner sleeve provided with slots. This building kit, as also with other known constructions, is expensive to manufacture, entailing costs. Moreover, the hitherto known constructions have the disadvantage, that they do not fully make it possible to utilize the employed rod material up to the the permissible local capability of the rods, because these constructions possess weakenings of the cross-sections of the rod due to welding seams, apertures or bores.

Thus, for example, the rod elements in a known building kit are provided at both ends with welded-on tapers. This is necessary in order to keep the joint elements small in diameter. Since however this relates to a radial welding seam, the permissible tightening is drastically reduced. Moreover, the tubular rods have fairly large oval or round apertures in the walls, which serve as assembly holes for the special round head screw to be inserted. Finally, the employed fastening screws have a transverse bore, in their shank through which an entraining pin is plugged for turning the screw. In this manner, the tension load on the screw is likewise reduced. The ball joint in addition possesses milled-on seating surfaces constituting support surfaces for the rod elements fastened thereon.

The present invention is based upon the object of improving the load capability of the tube-shaped rods and the load capability of the coupling elements by retention of unweakened cross-sections and simultaneously to cheapen the manufacture as well as to simplify the assembly.

This problem is solved according to the invention essentially in the manner that the end regions of the integrally formed rods, which by means of a bottle neck-shaped constriction have a substantially reduced diameter relative to the rod thickness, display an internal thread, the pitch of which deviates from the pitch of the threads of the same sense worked into the joint bores, and that the coupling devices, provided for the connection of the joints with the rods, each comprises a bolt provided at both ends with threads of the same sense and of different pitch, and a box spanner sleeve arranged axially displaceably, yet non-rotatably thereon. Preferably, the tapered rod ends should in that case possess a thicker wall thickness relative to the remaining wall thickness. In consequence of these measures according to the invention, the tube-shaped rods can be formed without welding seams and without bores, apertures or the like serving as assembly holes. Furthermore, the coupling device now comprises merely two individual parts of unweakened cross-section. The tube-shaped rod elements can be reduced without expensive and weakening welding by cold deformation, in such a manner that a cylindrical end of smaller diameter arises behind a conical transition, wherein the transitions of the cone from the original tube diameter and to the smaller cylindrical end can extend harmonically with a relatively large radius. In that case the wall thickness in the cylindrical tube end becomes thicker than in the middle unreduced tube part.

According to a further feature of the invention, the joint-sided end face of the box spanner sleeve can be formed concave. In consequence of this measure, the joint element can comprise a hollow ball without planar seating surfaces, while a good seating of the coupling devices or the box spanner sleeve is nevertheless assured.

The coupling device for the connection of the tube-shaped rods with the ball joints, manufactured for example according to the DT-OS 2,107,459, consists as stated of only two parts, namely of the bolt provided with the different thread pitches in the following called "differential thread bolt" — and the box spanner sleeve. The threaded bolt has at its end facing the joint, the thread fitting there with the greater pitch and at the end facing the rod element the thread fitting there with smaller pitch. Since this differential thread bolt should be screwed as far as possible into the rod element before the assembly, it will not screw out of the thread of the non-rotating rod element during turning into the ball joint. Since however the pitch in both threads is different, the spacing of the elements to be connected will reduce, namely on each rotation, by the amount of the pitch difference of both kinds of threads.

Other objects and features of the present invention will become apparent from the following detailed description when taken in connection with the accompanying drawing which discloses several embodiments of the invention. It is to be understood that the drawing is designed for the purposes of illustration only, and is not intended as a definition of the limits and scope of the invention disclosed.

In the drawing, wherein similar reference numerals denote similar elements throughout the several views.

Figure 1:
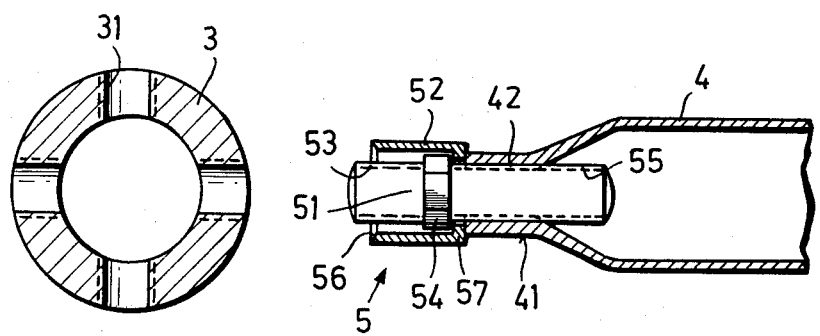
FIG. 1 is a section view of a tube-shaped rod with turned-in coupling device and with associated joint.
Figure 2:
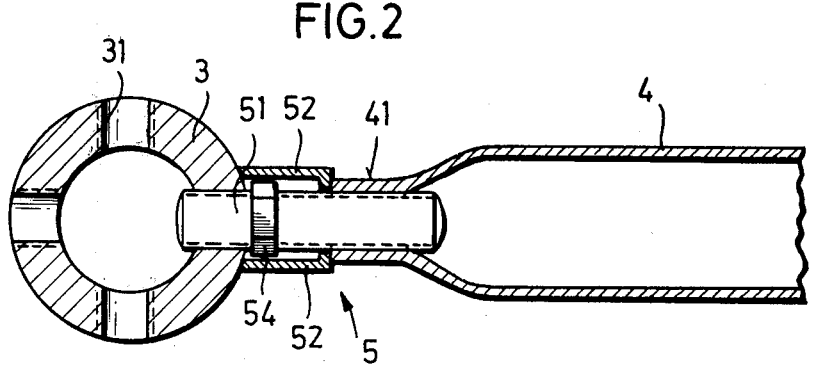
FIG. 2 is a section of the same parts in the assembled state.

Referring now to FIGS. 1 and 2, in accordance with the invention, the building kit for the production of three-dimensional frameworks comprises ball-shaped joints 3, tube-shaped rods 4 and coupling devices 5, cooperating operatively together.

The ball-shaped joint 3 possesses radial bores 31 provided with internal threading. The tube-shaped rods 4 possess at an end side, a bottleneck-shaped constriction 41 and at the end side a cylindrical part, respectively, the diameter of which is substantially smaller than the remaining rod diameter. The wall thickness of the cylindrical part 41 is substantially thicker than the remaining wall thickness of the rod 4. An internal thread 42 is worked into each cylindrical part 41 of the tube shaped rods.

The coupling device 5 comprises a differential threaded bolt 51 and a box spanner sleeve 52. The differential thread bolt 51 at the outer part of the bolt has a thread 53 of greater pitch, which fits into a threaded hole 31 of the ball-shaped joint 3. Disposed behind the threaded portion 53 is a key surface 54 integral with the bolt 51 which fits into a corresponding recess of the box spanner sleeve 52 and which can axially slide therein. Disposed at the rear end of the differential thread bolt 51 is a thread 55 with a smaller pitch relative to the thread 53. This thread 55 conforms with the thread 42 of the rod part 41.

The box spanner sleeve 52 at the joint-sided connecting side has a concavely formed support surface 56 and at the other end an inwardly drawn concentric collar 57, which renders the box spanner sleeve 52 (after the screwing-in of the coupling device 5) captive during transport in the respective end of a tube-shaped rod 4, and at the same time limits the screwing-in length of the differential thread bolt 51 in the rods 4, since this is necessary for the production of a secure threaded connection of the building kit system. Externally, the box spanner sleeve 52 is provided with outer spanner faces, so that it can be rotated by means of a screw spanner.

The assembly of the building kit is feasibly simple. In the embodiment according to FIG. 1, the elements are ready for assembly. In that case, the differential thread bolt 51 is screwed by rotation of the box spanner sleeve 52 as far as possible into the part 41 of the rod 4. The collar 57 of the box spanner sleeve in that case rests hard against the end face of the rod part 41. The coupling device is thereby captive in transport and the thread 53 is protected to a large extent against transport damage.

On operatively screwing the rod 4 onto the joint 3, the box spanner sleeve 52 is turned in the screw sense, while the parts 3 and 4 do not rotate therewith, because they are firmly clamped in the already present construction of a three-dimensional framework. Only during the assembling of the first elements, must one prevent these from rotating, when one tightens the differential thread bolt 51 through means of the box spanner sleeve 52.

During the screwing-in process, the thread 53 screws more rapidly into the threaded hole 31 than the thread 55 screws out of the rod end. The difference of the two thread pitches yields the degree of approach of the parts 3 and 4 relative to one another until finally these are assembled in the state according to FIG. 2, wherein the box spanner sleeve 52 is clamped fast between the elements 3 and 4. In that case, the hexagon 54 of the differential thread bolt 51 has executed a relative motion in axial direction towards the joint 3. The hexagon 54 also constitutes an entraining cam 54 integral therewith and carried by the bolt 51 which cam axially presses against the collar 57 in the position of the bolt of FIG. 1.

While only a single embodiment of the present invention has been shown and described, it will be obvious to those skilled in the art that many changes and modifications may be made thereto without departing from the spirit and scope of the invention.

What is claimed is:

1. A building kit for the production of three-dimensional frameworks comprising:
   a ball-shaped joint having threaded joint bores;
   integral-formed tube-shaped rods having end regions;
   coupling means provided at said rod end regions for threaded connection of said rods with said bores of said joints, said coupling means each comprises a bolt provided at both ends with bolt threads of a same sense and of a different pitch and a box spanner sleeve axially displaceable yet non-rotatably disposed thereon;
   said end regions of said integrally formed rods are formed with a substantially reduced diameter relative to the thickness of the rod by means of a bottleneck-shaped constriction thereof having an internal thread, the pitch of which has the same sense as that of said joint bores and deviates from the pitch of the threads of said joint bores; and
   said box spanner sleeve has a joint-sided end face which is formed concave.

2. A building kit for the production of three-dimensional frameworks comprising:
   a ball-shaped joint having threaded joint bores;
   integral-formed tube-shaped rods having end regions;
   coupling means provided at said rod end regions for threaded connection of said rods with said bores of said joints, said coupling means each comprises a bolt provided at both ends with bolt threads of a same sense and of a different pitch and a box spanner sleeve axially displaceable yet non-rotatably disposed thereon;
   said end regions of said integrally formed rods are formed with a substantially reduced diameter relative to the thickness of the rod by means of a bottleneck-shaped constriction thereof having an internal thread, the pitch of which has the same sense as that of said joint bores and deviates from the pitch of the threads of said joint bores; and
   said box spanner sleeve has an inwardly directed, concentrically encircling collar, and entraining cam means arranged on said bolt bears in axial direction against said collar.

* * * * *